F. M. GLENN.
MEAT CUTTER.
APPLICATION FILED FEB. 5, 1916.
1,201,168.
Patented Oct. 10, 1916.
3 SHEETS—SHEET 1.
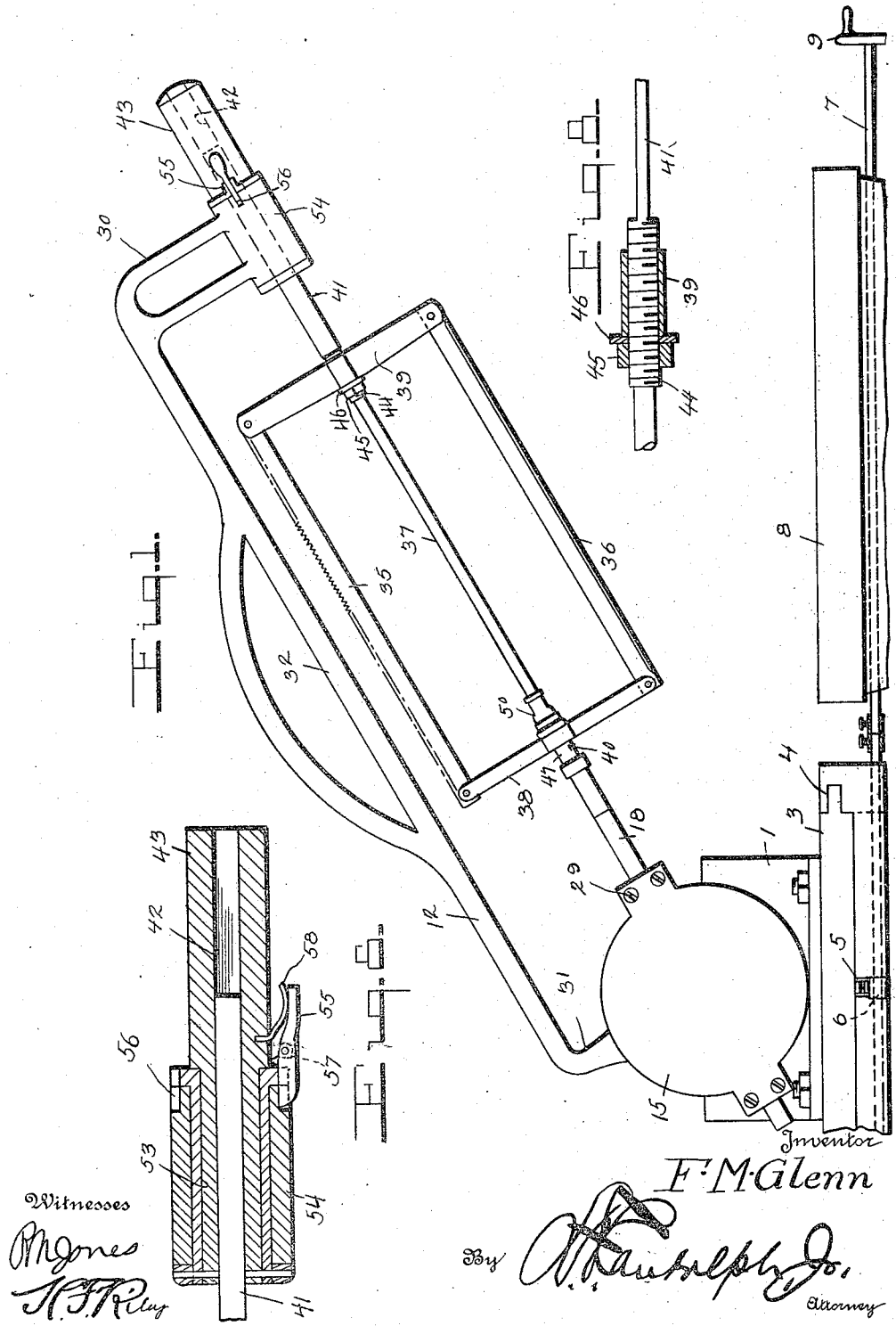
Witnesses
M. Jones
H. F. Riley
Inventor
F. M. Glenn
By
Attorney

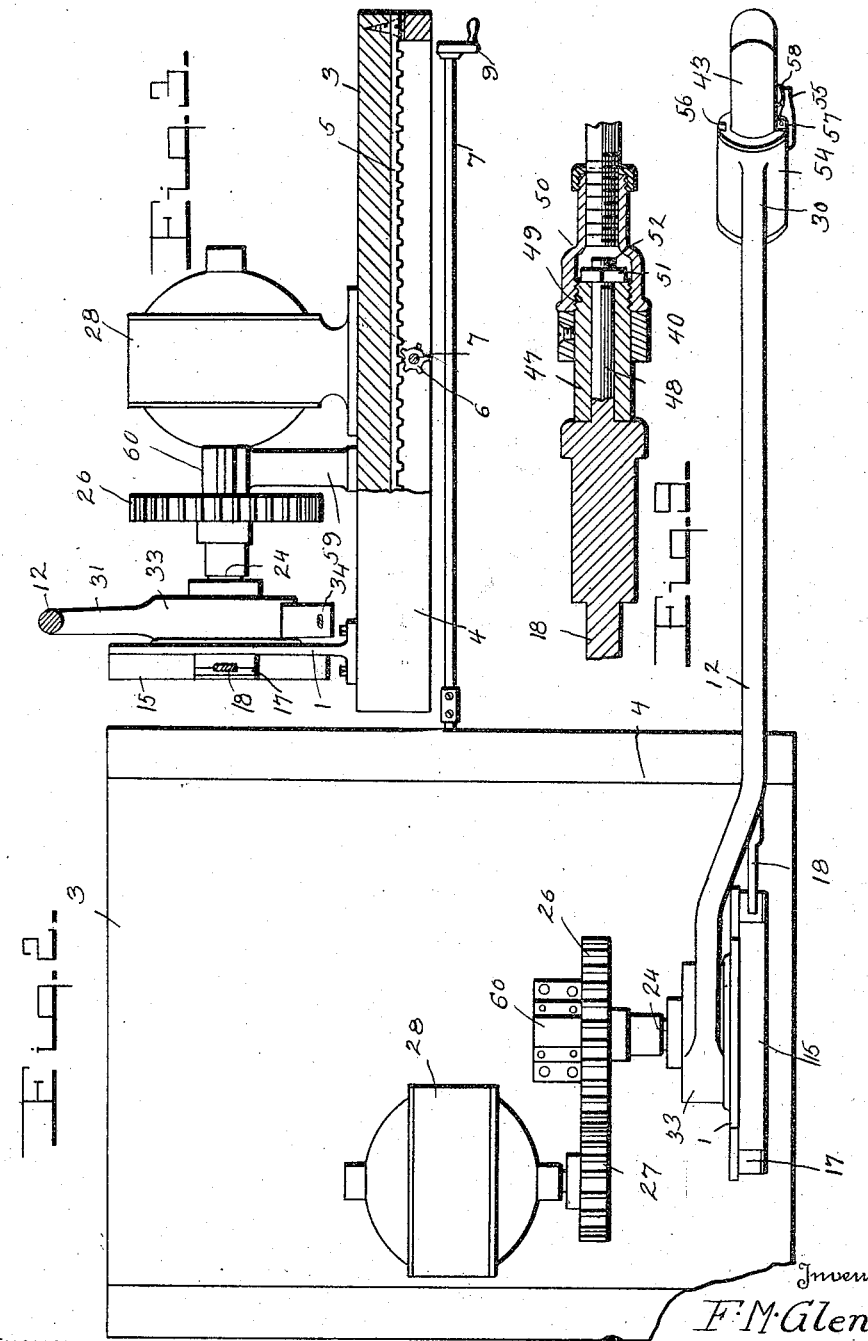

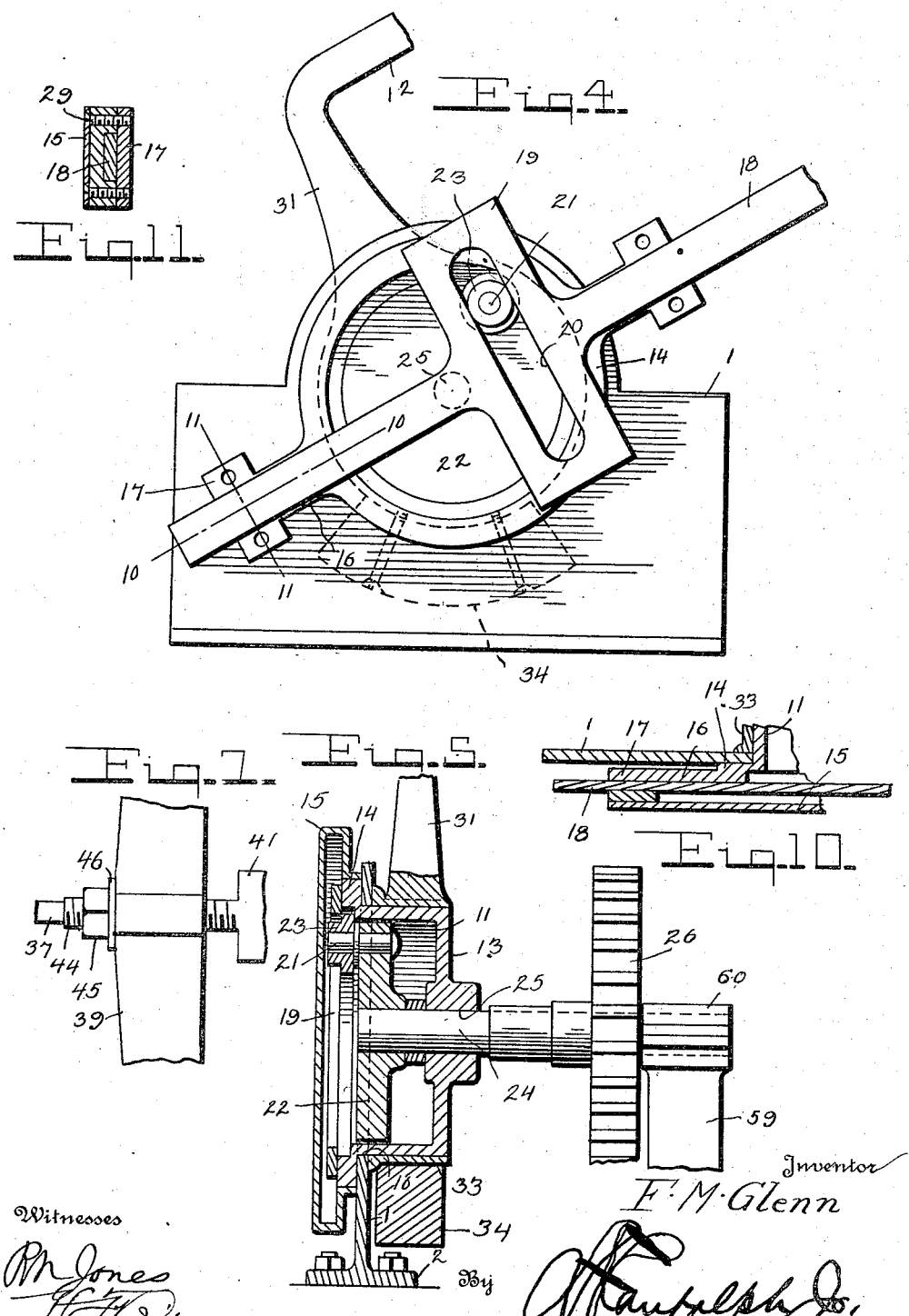

UNITED STATES PATENT OFFICE.

FRANK M. GLENN, OF PARSONS, WEST VIRGINIA, ASSIGNOR OF ONE-FOURTH TO OTIS A. MILLER, OF PARSONS, WEST VIRGINIA.

MEAT-CUTTER.

1,201,168.  Specification of Letters Patent.  Patented Oct. 10, 1916.

Application filed February 5, 1916. Serial No. 76,416.

*To all whom it may concern:*

Be it known that I, FRANK M. GLENN, a citizen of the United States, residing at Parsons, in the county of Tucker and State of West Virginia, have invented certain new and useful Improvements in Meat-Cutters; and I do hereby declare the following to be a full, clear, and exact description of the invention, such as will enable others skilled in the art to which it appertains to make and use the same.

The invention relates to improvements in meat cutters.

The object of the present invention is to improve the construction of meat cutters and to provide a simple, practical, and comparatively inexpensive meat cutter of strong and durable construction designed for the use of butchers and capable of enabling meat to be rapidly and accurately cut.

A further object of the invention is to provide a meat cutter of this character adapted to be driven by an electric or other motor and equipped with a reciprocatory saw and knife mounted for vertical oscillatory movement and also pivotal movement and adapted to be readily controlled with a personal touch similar to an ordinary saw or butcher knife to adapt the operation of the meat cutter to the character of the meat or bone being cut.

The invention also has for its object to provide a meat cutter of this character mounted upon and carried by a slidable table and adapted to be moved over a piece of meat arranged upon a block so that the saw may be arranged to operate on any portion of the meat without requiring the meat to be moved to the saw.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction may be resorted to without departing from the spirit or sacrificing any of the advantages of the invention.

In the drawings Figure 1 is a side elevation of a meat cutter constructed in accordance with this invention, Fig. 2 is a plan view of the same, Fig. 3 is a sectional view taken longitudinally of the table, parts being in elevation, Fig. 4 is an enlarged side view of a portion of the meat cutter illustrating the construction for actuating the saw and the knife, Fig. 5 is a sectional view taken transversely of Fig. 4, the reciprocatory bar being in a horizontal position, Fig. 6 is an enlarged detail view of the rotary handle, Fig. 7 is a detail view of a portion of one end of the saw and knife carrying frame, Fig. 8 is a sectional view of the same, Fig. 9 is a sectional view of the other end of the knife and saw carrying frame, illustrating the construction of the swivel joint thereof, Fig. 10 is a detail sectional view on the line 10—10 of Fig. 4, Fig. 11 is a detail sectional view on the line 11—11 of Fig. 4.

Like numerals of reference designate corresponding parts in the several figures of the drawings.

In the accompanying drawings in which is illustrated the preferred embodiment of the invention, the meat cutter comprises in its construction a pedestal 1 provided with a lower attaching portion 2 which is secured upon a slidable table 3 mounted in longitudinal guides or ways 4 and equipped with a longitudinally disposed rack bar 5 located at the under side of the table or support 3 and adapted to be engaged by a pinion 6. The pinion 6 which is mounted on an operating shaft 7 is adapted to be rotated to actuate the slidable table and move the same in either direction. The operating shaft 7 which extends beneath a bench or meat block 8 is provided at its outer end with a suitable operating device 9 which may consist of a crank as shown or be constructed in any desired manner. By this construction the slidable table is adapted to be readily operated from the front of the meat block or bench to arrange the meat cutter in the desired position with relation to the meat on the block or bench. This obviates the necessity of moving the meat to the saw and it will enable the saw or knife hereinafter described to be handled with the facility and accuracy of a hand saw or knife without the labor incident to the use of the same. The pedestal 1 is provided with a horizontal bearing opening 10 in which is mounted a casing 11 which constitutes the pivot of a vertically oscillating frame 12. The casing 11 which has a rear end wall 13 is open at the front and is provided thereat with an annular flange 14 on which is mounted a removable dust cap 15. The annular flange is provided with oppositely disposed arms 16 having guides 17 in which is mounted a longitudinally reciprocable bar 18 having an enlargement 19 located intermediate of the ends of the bar and provided with a slot 20 disposed transversely of the reciprocable bar and receiving the wrist pin 21 of a crank disk or wheel 22 whereby when the crank disk or wheel is rotated the bar or member 18 will be reciprocated. The wrist pin is provided with an anti-friction wheel 23 and the crank disk or wheel is mounted on a shaft 24 journaled in a bearing opening 25 of the end wall 13 of the pivotally mounted casing 11. The crank disk or wheel is located within the casing and the shaft 24 which is horizontally disposed carries a gear wheel 26 which meshes with a gear 27 of an electric motor 28 but any other suitable motor may be employed for actuating the meat cutter. The dust cap or housing which is adapted to protect the reciprocatory bar or member and the means for actuating the same is secured in position by the fastening devices 29 of the guides 17. The guides 17 consist of recessed blocks secured to the arms 16 as clearly illustrated in Figs. 10 and 11.

The vertically movable oscillatory frame 12 which is approximately U-shaped is composed of front and rear end portions 30 and 31 and a connecting portion 32 and it is provided at its rear portion 31 with a sleeve 33 shrunk on the casing 11 and located at the rear side of the pedestal 1. By this construction the pedestal is arranged between the sleeve 33 and the flange 14 whereby the casing is securely fastened within the bearing opening of the pedestal to form the pivot of the frame 12. The sleeve is also provided at the back with a counterweight 34 which is adapted to support the frame 12 in an elevated position as illustrated in Fig. 1 of the drawings to maintain the saw 35 and the knife 36 above the block or bench 8 and out of the way.

The saw and the knife are carried by a rotary frame consisting of a longitudinal rod 37 and transverse bars 38 and 39 centrally secured to the rods at the terminals thereof and provided at their ends with bifurcations for the reception of the saw 35 and the knife 36. One end of the rod is connected with the reciprocable bar or member 18 by a swivel 40 and the other end of the rod is provided with a slide 41 which reciprocates in an opening 42 of a pivotally mounted handle 43. The outer portion of the rod 37 is threaded at 44 to receive a nut 45 located at the inner edge of the outer bar 39 and adapted to force the latter outwardly to stretch the saw and the knife blade to the desired tension. A washer 46 is interposed between the nut 45 and the bar 39 as clearly illustrated in Fig. 8 of the drawings. The swivel 40 comprises in its construction a sleeve 47 mounted on a reduced portion or stem 48 of a reciprocatory bar or member 18 and having a threaded terminal portion 49 on which is secured an interiorly threaded coupling sleeve or tubular coupling member 50. The coupling member 50 constitutes a reducing member and is provided with portions of different diameters, one of the portions fitting the said sleeve 47, the other being interiorly threaded to receive the rear end of the rod 37. The bar 38 is secured directly to the sleeve 47 which is adapted to rotate on the stem 48 and which is retained thereon by a nut 51 arranged on a threaded portion of the said stem 48 as clearly illustrated in Fig. 9 of the drawings.

The slide 41 consists of a flat bar or piece and the opening 42 of the handle 43 is oblong in cross section to fit the slide 41. The handle 43 is provided with a reinforcing sleeve 53 and is designed to be constructed of fiber or other suitable material and it rotates in the bearing 54 of the outer end portion 30 of the frame 12. The handle carries a spring actuated catch 55 to engage opposite grooves or notches in the bearing 54 by which the rotary handle is locked against rotary movement when either the knife blade or saw blade is in position for operating on the meat. The catch 55 which is pivoted at intermediate points at 57 is maintained in engagement with the notches or recesses 56 by a spring 58. The slide or bar 41 is adapted to reciprocate in the opening of the handle and the latter is adapted to be rotated in the bearing of the frame 12. These movements occur while the frame is moving downwardly through the meat or bone and the same may be cut with precision and either the saw blade or knife blade may be operated with the same freedom as an ordinary saw or knife. Also the frame in which the saw blade and the knife blade are mounted is adapted to be rotated to present either blade at the bottom for operation on the meat.

The crank shaft 24 which carries the crank disk or wheel is preferably supported at the outer end beyond the gear 26 by a post or standard 59 mounted on the table and provided at the top with a suitable bearing 60. Any suitable means may be employed for lubricating the meat cutter.

What is claimed is:—

1. A meat cutter of the class described including a pivotally mounted vertically movable oscillatory frame, a pivotally mounted rotatable frame carried by the oscillatory frame and provided with meat cutting means, means for reciprocating the rotatable frame, the last mentioned means being mounted for pivotal movement with the oscillatory frame, and means for controlling the rotary movement of the said rotatable frame during the reciprocation of the same whereby the thickness of the slice is controlled.

2. A meat cutter of the class described including a pivotally mounted oscillatory frame movable upwardly and downwardly, a rotatable frame carried by the oscillatory frame and provided with a saw blade and a knife blade, adapted to be turned to present either blade to the meat to be operated on and means for reciprocating the rotatable frame, and a handle mounted for rotary movement on the oscillatory frame and connected with the rotatable frame for controlling the rotary movement of the same while said rotatable frame is being reciprocated, whereby the thickness of the slice is regulated during the cutting thereof.

3. A meat cutter of the class described including a pivotally mounted frame movable upwardly and downwardly, a reciprocatory member carried by the pivoted end of the frame, a blade carrying frame connected with the said member and having relative rotary movement and means connected with the outer end of the blade carrying frame and with the pivotally mounted frame for slidably supporting the former and for permitting relative rotary movement of the same while the blade carrying frame is being reciprocated whereby the thickness of the slice is regulated during the cutting thereof.

4. A meat cutter of the class described including a pivotally mounted vertically movable oscillatory frame, a reciprocatory member carried by the pivoted end of the frame, a blade carrying frame swiveled to the reciprocatory member, a handle mounted for rotary movement on the oscillatory frame at the frame end thereof and having a guide opening and an arm or bar slidable in the said opening and connected with and supporting the blade carrying frame.

5. A meat cutter of the class described including a pivotally mounted oscillatory frame provided at the free end with a bearing having opposite notches, a reciprocatory member mounted on the said frame at the pivoted end thereof, a blade carrying frame swiveled to the reciprocatory member at one end and provided at the other end with an arm, a handle mounted in the said bearing and having an opening receiving the said arm and a catch carried by the handle and arranged to engage the notches of the said bearing.

6. A meat cutter of the class described including a pivotally mounted oscillatory frame, a reciprocatory member carried by the said frame, a handle mounted for rotary movement on the said frame, a blade carrying frame swiveled to the reciprocatory member and comprising a central rod and bars extending from opposite sides of the rod, blades supported by the projecting portions of the said bars and an arm or bar connected with the blade carrying frame and slidably supported by the said handle.

7. A meat cutter of the class described including a support having a bearing, an oscillatory frame located beyond the bearing and movable upwardly and downwardly and having a cylindrical casing journaled in the said bearing and provided with opposite guides, a reciprocatory member slidable in the said guides, a crank element mounted for rotary movement in the said casing and connected with and adapted to actuate the reciprocatory member and a blade holding frame carried by the oscillatory frame and connected with and actuated by the reciprocatory bar or member.

8. A meat cutter of the class described including a support having a bearing, an approximately U-shaped oscillatory frame located beyond the bearing and provided with a cylindrical casing journaled in the said bearing and having opposite guiding means also located beyond the bearing, a shaft journaled in the said casing and provided with a crank disk or wheel rotating within the said casing, a reciprocatory bar or member mounted in the said guiding means and actuated by the crank disk or wheel, a blade holding frame connected with the said member and controlling means carried by the free end of the oscillatory frame and connected with the blade holding frame.

In testimony whereof I affix my signature in presence of two witnesses.

FRANK M. GLENN.

Witnesses:
WILBUR YOUNG,
EARL NEWLON McCUE.